United States Patent
Bonwick et al.

(10) Patent No.: US 7,412,450 B1
(45) Date of Patent: Aug. 12, 2008

(54) METHOD AND APPARATUS FOR IDENTIFYING TAMPERING OF DATA IN A FILE SYSTEM

(75) Inventors: Jeffrey S. Bonwick, Los Altos, CA (US); Matthew A. Ahrens, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 506 days.

(21) Appl. No.: 10/853,874

(22) Filed: May 26, 2004

(51) Int. Cl.
*G06F 7/00* (2006.01)
*G06F 17/00* (2006.01)
*G06F 12/00* (2006.01)
*G06F 17/30* (2006.01)
*G06F 7/04* (2006.01)
*H04L 9/00* (2006.01)
*H04L 9/32* (2006.01)
*H03M 1/68* (2006.01)
*G06K 9/00* (2006.01)
*H04K 1/00* (2006.01)

(52) U.S. Cl. .................. 707/100; 707/200; 713/176; 726/26

(58) Field of Classification Search ............... 726/26; 713/176; 711/161; 380/251
See application file for complete search history.

(56) References Cited

U.S. PATENT DOCUMENTS

| | | | |
|---|---|---|---|
| 4,144,522 A | 3/1979 | Kageyama et al. | |
| 5,129,085 A | 7/1992 | Yamasaki et al. | |
| 5,155,847 A | 10/1992 | Kirouac et al. | |
| 5,371,885 A | 12/1994 | Letwin | |
| 5,403,639 A | 4/1995 | Belsan et al. | |
| 5,410,667 A | 4/1995 | Belsan et al. | |
| 5,675,802 A | 10/1997 | Allen et al. | |
| 5,819,292 A | 10/1998 | Hitz et al. | |
| 6,209,111 B1 | 3/2001 | Kadyk et al. | |
| 6,341,341 B1 | 1/2002 | Grummon et al. | |
| 6,728,922 B1 | 4/2004 | Sundaram et al. | |
| 6,745,284 B1 | 6/2004 | Lee et al. | |
| 6,745,305 B2 | 6/2004 | McDowell | |
| 6,795,966 B1 | 9/2004 | Lim et al. | |
| 6,829,617 B2 | 12/2004 | Sawdon et al. | |
| 6,857,001 B2 | 2/2005 | Hitz et al. | |
| 6,892,211 B2 | 5/2005 | Hitz et al. | |
| 7,007,196 B2 | 2/2006 | Lee et al. | |
| 7,032,154 B2 | 4/2006 | Kidorf et al. | |
| 7,043,677 B1 | 5/2006 | Li | |
| 7,133,964 B2 | 11/2006 | Rodrigues et al. | |
| 7,162,486 B2 | 1/2007 | Patel et al. | |

(Continued)

OTHER PUBLICATIONS

Austin, B.; "A Dynamic Disc Allocation Algorithm Designed to Reduce Fragmentation During File Reloading"; Information Sciences Laboratory, Corporate Research and Development Center, General Electric Company, 1970 (4 pages).

(Continued)

*Primary Examiner*—Don Wong
*Assistant Examiner*—Patrick A. Darno
(74) *Attorney, Agent, or Firm*—Osha Liang LLP

(57) ABSTRACT

A method for storing a data block, including storing the data block in a storage pool, obtaining a data block location, calculating a secure data block checksum for the data block, and storing a first indirect block in the storage pool, wherein the first indirect block comprises the data block location and the secure data block checksum.

5 Claims, 8 Drawing Sheets

U.S. PATENT DOCUMENTS

| | | | |
|---|---|---|---|
| 7,174,352 | B2 | 2/2007 | Kleiman et al. |
| 7,200,715 | B2 | 4/2007 | Kleiman et al. |
| 2002/0004883 | A1 | 1/2002 | Nguyen et al. |
| 2002/0055942 | A1 | 5/2002 | Reynolds |
| 2002/0087788 | A1 | 7/2002 | Morris |
| 2002/0161972 | A1 | 10/2002 | Talagala et al. |
| 2003/0033477 | A1 | 2/2003 | Johnson et al. |
| 2003/0126107 | A1 | 7/2003 | Yamagami |
| 2003/0145167 | A1 | 7/2003 | Tomita |
| 2004/0098720 | A1 | 5/2004 | Hooper |
| 2004/0107314 | A1 | 6/2004 | Kim et al. |
| 2004/0123063 | A1 | 6/2004 | Dalal et al. |
| 2004/0225834 | A1 | 11/2004 | Lu et al. |
| 2004/0234000 | A1 | 11/2004 | Page |
| 2005/0010620 | A1 | 1/2005 | Silvers et al. |
| 2005/0097270 | A1 | 5/2005 | Kleiman et al. |
| 2005/0235154 | A1* | 10/2005 | Serret-Avila ............... 713/176 |
| 2006/0168409 | A1* | 7/2006 | Kahn et al. ................. 711/161 |
| 2006/0218644 | A1* | 9/2006 | Niles et al. ................... 726/26 |
| 2006/0256965 | A1* | 11/2006 | Rowe ......................... 380/251 |

OTHER PUBLICATIONS

Goodheart, B. et al.; "The Magic Garden Explained"; Prentice Hall, 1994 (8 pages).

Stallings, W.; "Computer Organization and Architecture: Designing for Performance"; Prentice Hall, 2000 (4 pages).

Sandberg, R. et al.; "Design and Implementation of the Sun Network Filesystem"; Sun Microsystems, Inc., In Summer USENIX Conference Proceedings, Portland, OR, 1985 (12 pages).

McKusick, M. K. et al.; "A Fast File System for UNIX"; ACM Transactions on Computer Systems, vol. 2, No. 3, Aug. 1984, pp. 181-197 (17 pages).

Astrahan, M.M. et al.; "System R: Relational Approach to Database Management"; ACM Transactions on Database Systems, vol. 1, No. 2, Jun. 1976, pp. 97-137 (41 pages).

"VERITAS File System 3.4 Administrator's Guide"VERITAS Software Corporation, Nov. 2000, http://www.veritas.com; pp. 1-227 (277 pages).

Czezatke C. et al.; "Linlogfs: A Log-Structured Filesystem for Linux"; The USENIX Association, Proceedings of FREENIX Track: 2000 USENIX Annual Technical Conference, San Diego, CA, Jun. 18-23, 2000 (13 pages).

Osorlo, N. et al.; "Guidelines for Using Snapshot Storage Systems for Oracle Databases"; Oracle Corporation, Oct. 2001 (13 pages).

Quinlan, S.; "A Cached WORM File System"; AT&T Bell Laboratories, Murry Hill, New Jersey; Software-Practice and Experience, vol. 21(12), pp. 1289-1299, Dec. 1991 (11 pages).

Sun StorEdge Instant Image 2.0 System Administrator's Guide; Sun Microsystems, Inc., Feb. 2000, Revision A (106 pages).

Ylonen, T.; "Concurrent Shadow Paging: A New Direction for Database Research"; Laboratory of Information Procesing Science, Helsinki University of Technology, SF-02150, Espoo, Finland, 1992 (8 pages).

Popek, G. et a;.; "The LOCUS Distributed System Architecture"; THE MIT Press, Cambridge, Massachusetts, 1985 the Massachusetts Institute of Technology (8 pages).

Gray, J. et al.; "The Recovery Manager of the System R Database Manager"; Computing Surveys, vol. 13, No. 2, June 1981 (20 pages).

Schilling, J.; "Enwurf und Implementierung eines schnellen Filesystems fur Unix unter besonderer Berucksichtigung der technischen Parameter optischer Speichermedien und multimedialer Anwendungen"; Diplomarbeir Jorg Schilling, eingereicht am May 23, 1991 an der TU Berlin, and English Translation (245 pages).

Ylonen, T.; "Concurrent Shadow Paging: Snapshots, Read-Only Transactions, and ON-The-Fly Multi-Level Incremental Dumping"; Laboratory of Information Processing Science, Helsinki University of Technology, Fin-02150, Espoo, Finalnd, 1993 (22 pages).

"The Enterprise Challenge Served by Snapshot"; Whitepaper, 2001 LSI Logic Corporation (8 pages).

Argawal, R. et al.; "Integrated Concurrency Control and Recovery Mechanisms: Design and Performance Evaluation"; ACM Transactions on Database Systems, vol. 10, No. 4, Dec. 1985, pp. 529-564 (36 pages).

Suresh, Babu S.; "Presistent Snapshots"; Department of Computer Science and Automation, Indian Institute of Science, Bangalore - 560 012, Jan. 2000 (38 pages).

"Proceedings of the 5th Annual Linux Showcase & Conference" USENIX Association, Oakland, California, Nov. 5-10, 2001 (11 pages).

Borg, A. et al; "Fault Tolerance Under UNIX" ACM Transactions on Computer Systems, vol. 7, No. 1, Feb. 1989, pp. 1-24 (24 pages).

Rosenblum, M. et al.; "The Design and Implementation of a Log-Structured File System"; Electrical Engineering and Computer Sciences, Computer Science Division, University of California, 1991 (15 pages).

Hecht, M. S. et al.; "Shadowed Management of Free Disk Pages with a Linked List"; ACM Transactions on Database Systems, vol. 8, No. 4, Dec 1983, pp. 503-514 (12 pages).

Rosenblum, M. et al.; "The LFS Storage Manager" Computer Science Division, Electrical Engineering and Computer Sciences, University of California; presented at the Summer '90 USENIX Technical Conference, Anaheim, California, Jun. 1990 (16 pages).

Lorie, R. A.; "Physical Integrity in a Large Segmented Database"; ACM Transactions on Database Systems, vol. 2, No. 1, Mar. 1977, pp. 91-104 (14 pages).

Johnson, J. E. et al.; "Overview of the Spiralof File System", Digital Technical Journal, vol. 8, No. 2, 1996, pp. 5-14 (10 pages).

Santry, D.S. et al.; "Deciding When to Forget in the Elephant File SYstem"; 17th ACm Symposium on Operating Systems Principles (SOSP '99), Dec. 1999; pp. 110-123 (14 pages).

Chutani, S. et al., "The Episode File System"; Proceedings of the 1992 USENIX Winter Technical Conference; 1992; (18 pages).

Seltzer, M.L.; "File System Performance and Transaction Support"; University of California at Berkeley, 1992 (131 pages).

* cited by examiner

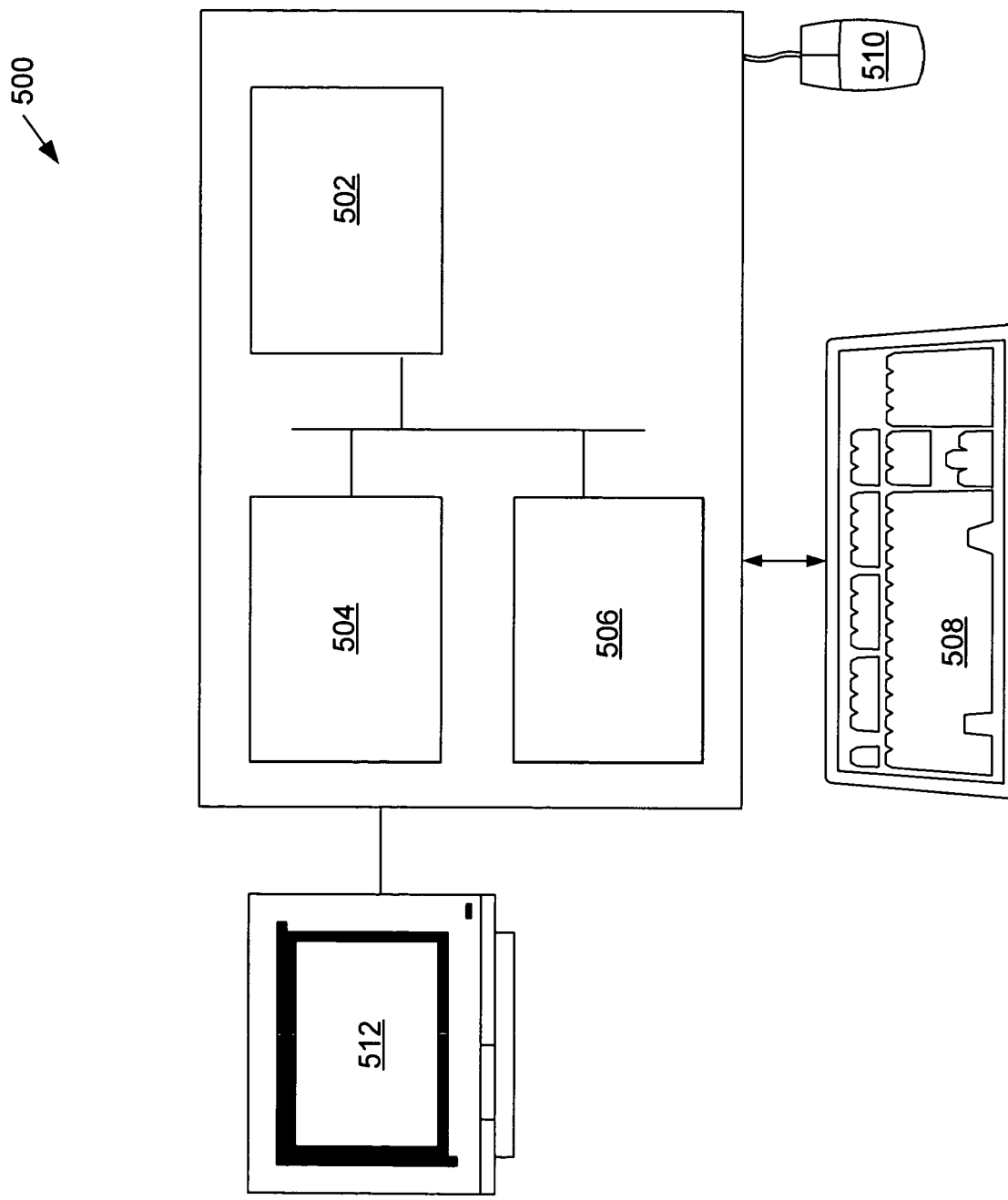

METHOD AND APPARATUS FOR IDENTIFYING TAMPERING OF DATA IN A FILE SYSTEM

BACKGROUND

A typical operating system includes a file system. The file system provides a mechanism for the storage and retrieval of files and a hierarchical directory structure for the naming of multiple files. More specifically, the file system stores information provided by the user (i.e., data) and information describing the characteristics of the data (i.e., metadata). The file system also provides extensive programming interfaces to enable the creation and deletion of files, reading and writing of files, performing seeks within a file, creating and deleting directories, managing directory contents, etc. In addition, the file system also provides management interfaces to create and delete file systems. File systems are typically controlled and restricted by operating system parameters. For example, most operating systems limit the maximum number of file names that can be handled within their file system. Some operating systems also limit the size of files that can be managed under a file system.

An application, which may reside on the local system (i.e., computer) or may be located on a remote system, uses files as an abstraction to address data. Conventionally, this data is stored on a storage device, such as a disk.

To access a file, the operating system (via the file system), typically provides file manipulation interfaces to open, close, read, and write the data within each file. More specifically, the file system stores data on the storage device by managing the allocation of space within the storage device. Typically, the volume manager provides space which is managed by the file system. Two common types of file system space allocation strategies are known as block-based allocation and extent-based allocation. Block-based allocation creates incremental disk space for each file each time the file is extended (i.e., modified via a write request to add information), whereas extent-based allocation creates a large series of contiguous blocks (i.e., extents) each time the file exhausts the space available in the file's last extent.

When allocating space, both block-based and extent-based allocations use space provided by the volume manager. The volume manager allows multiple physical disks to be used as a single volume (i.e., a virtual disk) to provide larger consolidated storage sizes and simpler management. The volume manager allows users to organize data along volume boundaries (i.e., each volume has physical disk space allocated to the volume such that the volume is tied only to that dedicated physical disk). The volume manager is typically implemented as a separate layer between the physical disks and the file system, and is presented to the user as a virtual disk device. In other words, volume managers organize the collections of physical devices (e.g., disks) into virtual devices. Additionally, the space allocated within the volume manager is handled by the file system. Consequently, the volume manager is not aware of which blocks within the available storage space are in use and which blocks are free for data to be stored.

Further, file systems may be mounted on the virtual disk devices. Thus, physical disks are partitioned and allocated to multiple virtual disk devices, and each virtual disk device is capable of having a file system that exclusively uses that particular virtual disk device. A request to access a file is typically performed by an application, via the file system, using a file name and logical offset. This file name and logical offset (i.e., the manner in which applications express file operation requests) corresponds to a location within the virtual disk device. Subsequently, the request is translated to physical disk space on the storage device by the volume manager, allowing the user of the application to access the data within a particular file.

SUMMARY

In general, in one aspect, the invention relates to a method for storing a data block, comprising storing the data block in a storage pool, obtaining a data block location, calculating a secure data block checksum for the data block, and storing a first indirect block in the storage pool, wherein the first indirect block comprises the data block location and the secure data block checksum.

In general, in one aspect, the invention relates to a method for storing a first data block and a second data block in a file system, comprising storing the first data block and the second data block in a storage pool, obtaining a first data block location and a second data block location, calculating a first secure data block checksum for the first data block, calculating a second secure data block checksum for the second data block, and storing an array of block pointers in an indirect block, wherein the array block of pointers comprises, a first block pointer comprising the first data block location and the first secure data block checksum, and a second block pointer comprising the second data block location and the second secure data block checksum.

In general, in one aspect, the invention relates to a method for determining whether a file system has been tampered, comprising retrieving a file system digital signature for the file system, determining whether the retrieved file system digital signature is equal to a stored file system digital signature, obtaining a data block from the file system, if the retrieved file system digital signature is equal to the stored file system digital signature, and notifying a user, if the retrieved file system digital signature is not equal to the stored file system digital signature.

In general, in one aspect, the invention relates to a system, comprising a storage pool comprising a file system, wherein the file system comprises a plurality of child blocks, wherein each of the plurality of child blocks comprises one selected from the group consisting of a data block and an indirect block, wherein the indirect block references at least one of the plurality of child blocks, a root block referencing at least one of the plurality of child blocks, wherein the root block comprises a root secure checksum obtained using at least one of the plurality of child blocks, wherein the indirect blocks comprise a secure indirect block checksum obtained using at least one of the plurality of child blocks, a storage pool allocator configured to store the root block and the plurality of child blocks in the storage pool.

In general, in one aspect, the invention relates to a computer system for determining whether a file system has been tampered, comprising a processor, a memory, a storage device, and software instructions stored in the memory for enabling the computer system under control of the processor, to retrieve a file system digital signature for the file system determine whether the retrieved file system digital signature is equal to a stored file system digital signature, obtain a data block from the file system if the retrieved file system digital signature is equal to the stored file system digital signature; and, notify a user if the retrieved file system digital signature is not equal to the stored file system digital signature.

In general, in one aspect, the invention relates to a network system having a plurality of nodes, comprising a storage pool comprising a file system, wherein the file system comprises a plurality of child blocks, wherein each of the plurality of child blocks comprises one selected from the group consisting of a data block and a plurality of indirect blocks, wherein each of the plurality of indirect blocks references at least one of the plurality of child blocks, and a root block referencing at least one of the plurality of child blocks, wherein the root block comprises a root secure checksum obtained using at least one of the plurality of child blocks, wherein each of the plurality of indirect blocks comprises a secure indirect block checksum obtained using at least one of the plurality of child blocks, and a storage pool allocator configured to store the root block and the plurality of child blocks in the storage pool, wherein the storage pool is located on any one of the plurality of nodes, and wherein the storage pool allocator is located on any one of the plurality of nodes.

Other aspects of the invention will be apparent from the following description and the appended claims.

BRIEF DESCRIPTION OF DRAWINGS

FIG. 8 shows a computer system in accordance with an embodiment of the invention.

DETAILED DESCRIPTION

Figure 1:
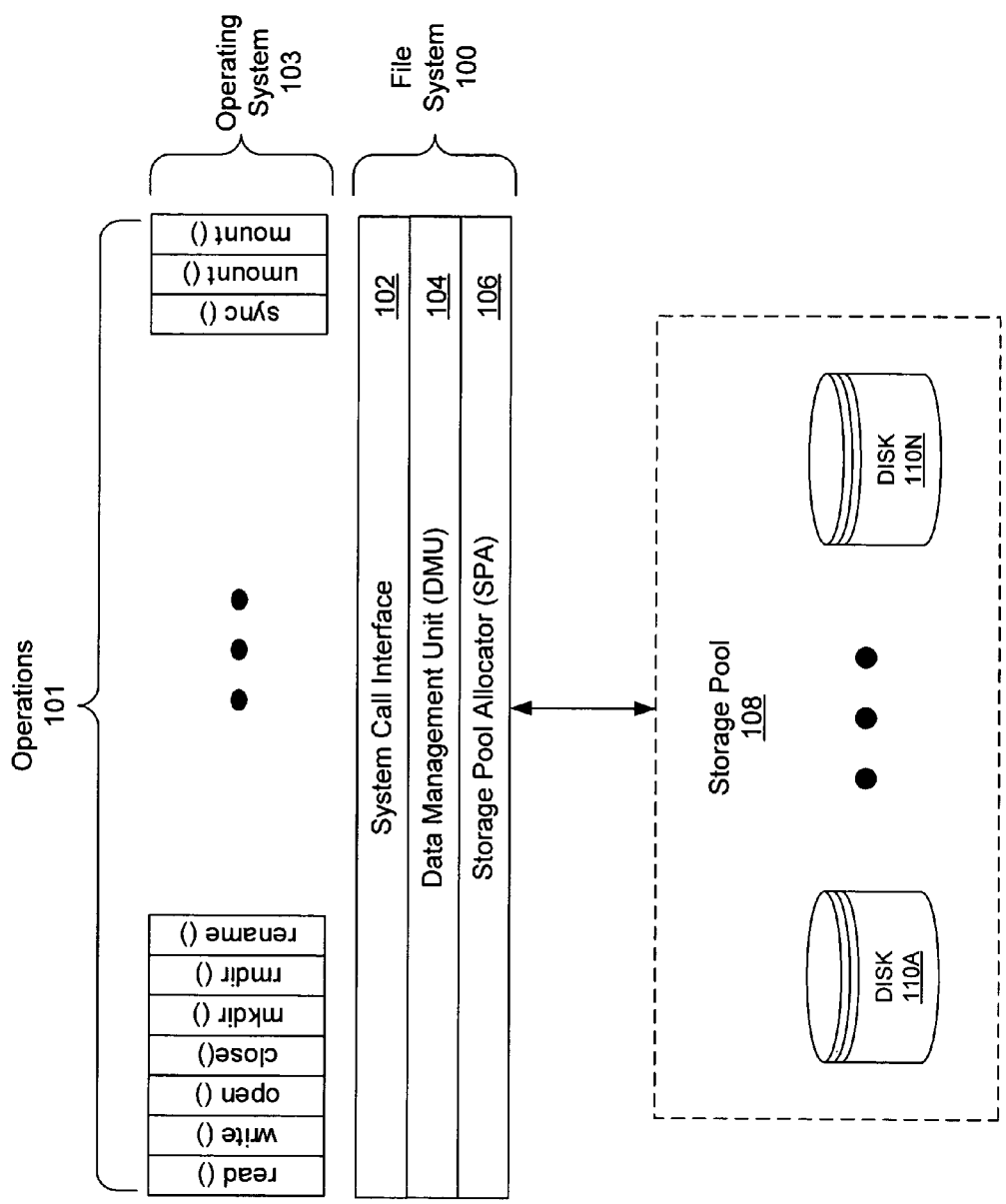
FIG. 1 shows a system architecture in accordance with an embodiment of the invention.

Exemplary embodiments of the invention will be described with reference to the accompanying drawings. Like items in the drawings are shown with the same reference numbers.

In an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention provide a method and apparatus to detect data tampering within a file system. More specifically, embodiments of the invention provide a method and apparatus to generate a digital signature for the file system. Further, embodiments of the invention provide a method and apparatus for using the digital signature to detect data tampering within the file system. Further, embodiments of the invention provide a method and apparatus for detecting data tampering within individual blocks within the file system.

FIG. 1 shows a system architecture in accordance with one embodiment of the invention. The system architecture includes an operating system (103) interacting with a file system (100), which in turn interfaces with a storage pool (108). In one embodiment of the invention, the file system (100) includes a system call interface (102), a data management unit (DMU) (104), and a storage pool allocator (SPA) (106).

The operating system (103) typically interfaces with the file system (100) via a system call interface (102). The operating system (103) provides operations (101) for users to access files within the file system (100). These operations (101) may include read, write, open, close, etc. In one embodiment of the invention, the file system (100) is an object-based file system (i.e., both data and metadata are stored as objects). More specifically, the file system (100) includes functionality to store both data and corresponding metadata in the storage pool (108). Thus, the aforementioned operations (101) provided by the operating system (103) correspond to operations on objects.

More specifically, in one embodiment of the invention, a request to perform a particular operation (101) (i.e., a transaction) is forwarded from the operating system (103), via the system call interface (102), to the DMU (104). In one embodiment of the invention, the DMU (104) translates the request to perform an operation on an object directly to a request to perform a read or write operation at a physical location within the storage pool (108). More specifically, the DMU (104) represents the objects as data blocks and indirect blocks as described in FIG. 3 below. Further, in one embodiment of the invention, the DMU (104) includes functionality to detect data tampering within the file system (or within a particular block within the file system). In one embodiment of the invention, the DMU (104) uses a secure checksum stored in the root block or an indirect block to detect data tampering within the file system. This is described below in FIGS. 6 and 7.

Additionally, in one embodiment of the invention, the DMU (104) includes functionality to group related work (i.e., modifications to data blocks and indirect blocks) into I/O requests allowing related blocks to be forwarded to the SPA (106) together. The SPA (106) receives I/O requests from the DMU (106) and subsequently writes the blocks into the storage pool (108). The operation of the SPA (106) is described in FIG. 2 below.

In one embodiment of the invention, the storage pool (108) includes one or more physical disks (disks (110A-110N)). Further, in one embodiment of the invention, the storage capacity of the storage pool (108) may increase and decrease dynamically as physical disks are added and removed from the storage pool. In one embodiment of the invention, the storage space available in the storage pool (108) is managed by the SPA (106).

Figure 2:
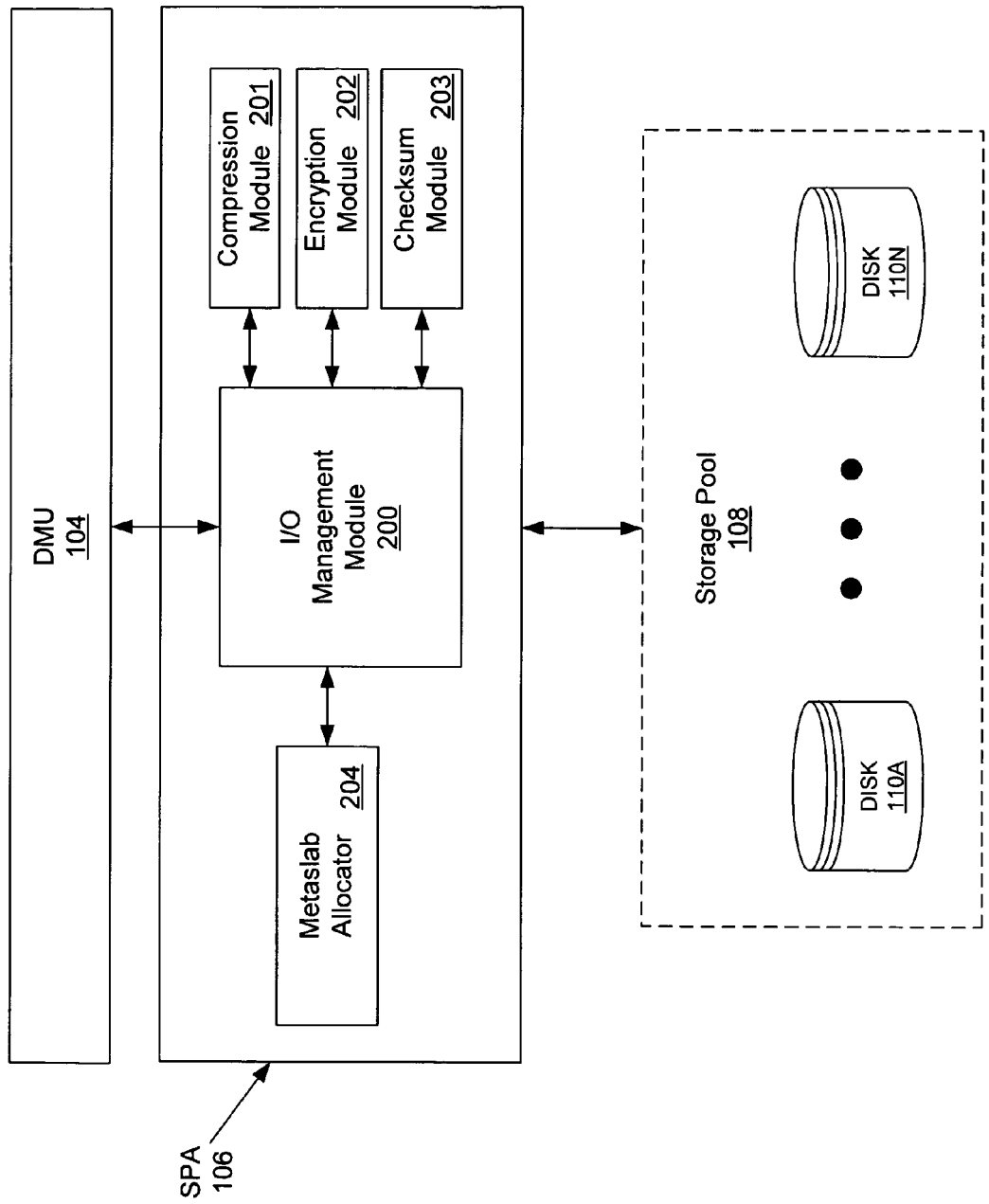
FIG. 2 shows a storage pool allocator in accordance with an embodiment of the invention.

FIG. 2 shows the SPA (106) in accordance with one embodiment of the invention. The SPA (106) may include an I/O management module (200), a compression module (201), an encryption module (202), a checksum module (203), and a metaslab allocator (204). Each of these aforementioned modules is described in detail below.

As noted above, the SPA (106) receives transactions from the DMU (104). More specifically, the I/O management module (200), within the SPA (106), receives transactions from the DMU (104) and groups the transactions into transaction groups in accordance with one embodiment of the invention. The compression module (201) provides functionality to compress larger logical blocks (i.e., data blocks and indirect blocks) into smaller segments, where a segment is a region of physical disk space. For example, a logical block size of 8K bytes may be compressed to a size of 2K bytes for efficient storage.

Further, in one embodiment of the invention, the encryption module (202) provides various data encryption algorithms. The data encryption algorithms may be used, for example, to prevent unauthorized access. In one embodiment of the invention, the checksum module (203) includes functionality to calculate a secure checksum for data (i.e., data stored in a data block) and metadata (i.e., data stored in an indirect block) within the storage pool. In one embodiment of the invention, the secure checksum corresponds to a checksum obtained using a strong checksum function, such as, Message Digest 5 (MD5), Secure Hashing Algorithm 1 (SHA1), etc. Those skilled in the art will appreciate that any checksum function that includes similar or equivalent cryptographic hashing properties as embodied in MD5 or SHA1 may also be used to generate a secure checksum.

As discussed above, the SPA (106) provides an interface to the storage pool and manages allocation of storage space within the storage pool (108). More specifically, in one embodiment of the invention, the SPA (106) uses the metaslab allocator (204) to manage the allocation of storage space in the storage pool (108).

In one embodiment of the invention, the storage space in the storage pool is divided into contiguous regions of data, i.e., metaslabs. The metaslabs may in turn be divided into segments (i.e., portions of the metaslab). The segments may all be the same size, or alternatively, may be a range of sizes. The metaslab allocator (204) includes functionality to allocate large or small segments to store data blocks and indirect blocks. In one embodiment of the invention, allocation of the segments within the metaslabs is based on the size of the blocks within the I/O requests. That is, small segments are allocated for small blocks, while large segments are allocated for large blocks. The allocation of segments based on the size of the blocks may allow for more efficient storage of data and metadata in the storage pool by reducing the amount of unused space within a given metaslab. Further, using large segments for large blocks may allow for more efficient access to data (and metadata) by reducing the number of DMU (104) translations and/or reducing the number of I/O operations. In one embodiment of the invention, the metaslab allocator may include a policy that specifies a method to allocate segments.

Figure 3:
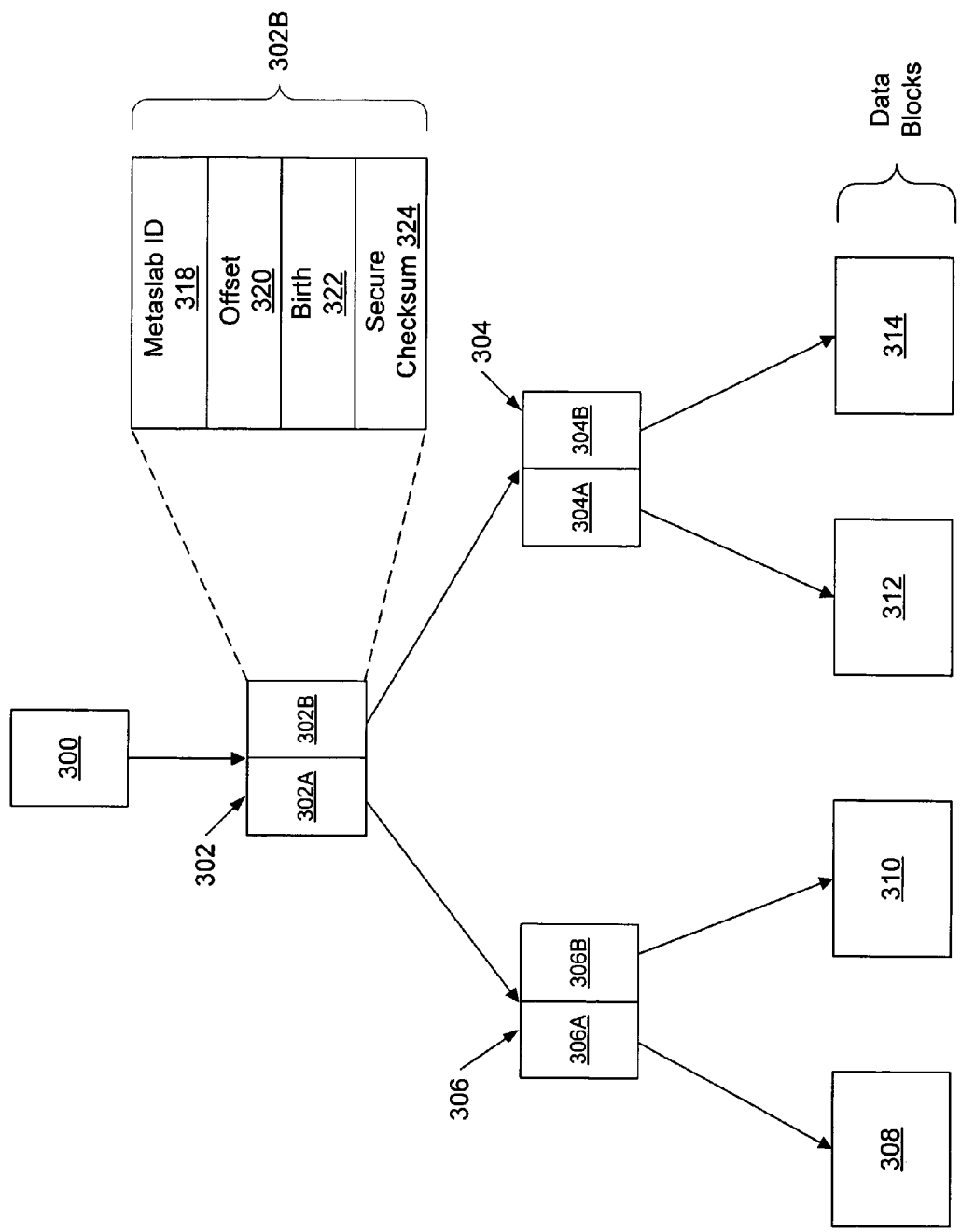
FIG. 3 shows a hierarchical data configuration in accordance with an embodiment of the invention.

As noted above, the storage pool (108) is divided into metaslabs, which are further divided into segments. Each of the segments within the metaslab may then be used to store a data block (i.e., data) or an indirect block (i.e., metadata). FIG. 3 shows the hierarchical data configuration (hereinafter referred to as a "tree") for storing data blocks and indirect blocks within the storage pool in accordance with one embodiment of the invention. In one embodiment of the invention, the tree includes a root block (300), one or more levels of indirect blocks (302, 304, 306), and one or more data blocks (308, 310, 312, 314). In one embodiment of the invention, the location of the root block (300) is in a particular location within the storage pool. The root block (300) typically points to subsequent indirect blocks (302, 304, and 306). In one embodiment of the invention, indirect blocks (302, 304, and 306) may be arrays of block pointers (e.g., 302A, 302B, etc.) that, directly or indirectly, reference to data blocks (308, 310, 312, and 314). The data blocks (308, 310, 312, and 314) contain actual data of files stored in the storage pool. One skilled in the art will appreciate that several layers of indirect blocks may exist between the root block (300) and the data blocks (308, 310, 312, 314).

In contrast to the root block (300), indirect blocks and data blocks may be located anywhere in the storage pool (108 in FIG. 1). In one embodiment of the invention, the root block (300) and each block pointer (e.g., 302A, 302B, etc.) includes data as shown in the expanded block pointer (302B). One skilled in the art will appreciate that data blocks do not include this information; rather data blocks contain actual data of files within the file system.

In one embodiment of the invention, each block pointer includes a metaslab ID (318), an offset (320) within the metaslab, a birth value (322) of the block referenced by the block pointer, and a secure checksum (324) of the data stored in the block (data block or indirect block) referenced by the block pointer. In one embodiment of the invention, the metaslab ID (318) and offset (320) are used to determine the location of the block (data block or indirect block) in the storage pool. The metaslab ID (318) identifies a particular metaslab. More specifically, the metaslab ID (318) may identify the particular disk (within the storage pool) upon which the metaslab resides and where in the disk the metaslab begins. The offset (320) may then be used to reference a particular segment in the metaslab. In one embodiment of the invention, the data within the segment referenced by the particular metaslab ID (318) and offset (320) may correspond to either a data block or an indirect block. If the data corresponds to an indirect block, then the metaslab ID and offset within a block pointer in the indirect block are extracted and used to locate a subsequent data block or indirect block. The tree may be traversed in this manner to eventually retrieve a requested data block.

In one embodiment of the invention, copy-on-write transactions are performed for every data write request to a file. Specifically, all write requests cause new segments to be allocated for the modified data. Therefore, the retrieved data blocks and indirect blocks are never overwritten (until a modified version of the data block and indirect block is committed). More specifically, the DMU writes out all the modified data blocks in the tree to unused segments within the storage pool. Subsequently, the DMU writes out the corresponding block pointers (within indirect blocks) to unused segments in the storage pool. In one embodiment of the invention, fields (i.e., metaslab ID, offset, birth, checksum) for the corresponding block pointers are populated by the DMU prior to sending an I/O request to the SPA. The indirect blocks containing the block pointers are typically written one level at a time. To complete the copy-on-write transaction, the SPA issues a single write that atomically changes the root block to reference the indirect blocks referencing the modified data block.

Figure 4:
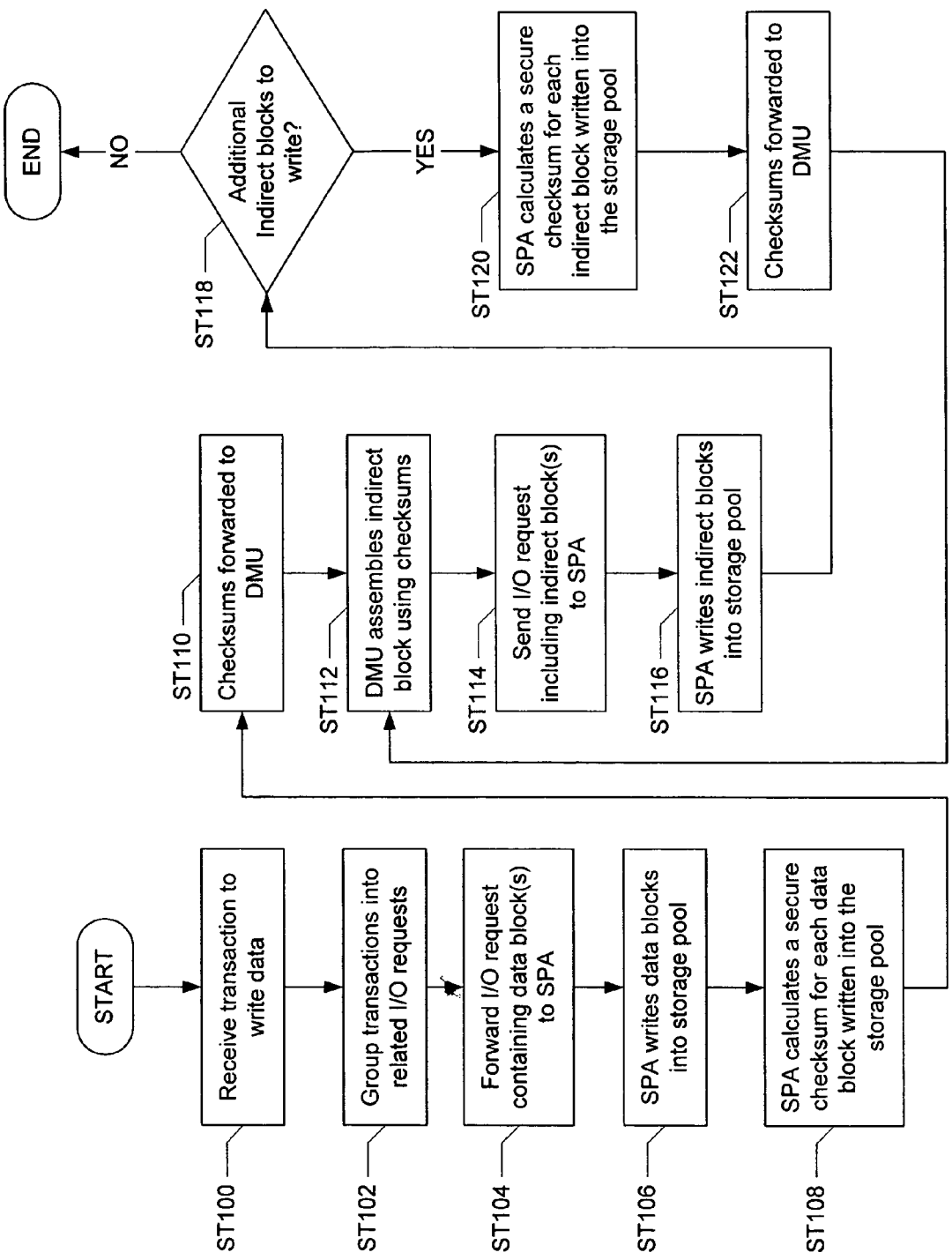
FIG. 4 shows a flow chart in accordance with an embodiment of the invention.

Using the infrastructure shown in FIGS. 1-3, the following discussion describes a method for detecting data tampering in a file system in accordance with one embodiment of the invention. FIG. 4 shows a flow chart in accordance with one embodiment of the invention. Initially, the DMU receives a transaction from an application, the operating system (or a subsystem therein), etc. (ST 100). The DMU subsequently groups transactions into one or more I/O requests (ST 102). The I/O requests are subsequently forwarded to the SPA (ST 104).

In one embodiment of the invention, the transaction includes one or more data blocks, and/or one or more indirect blocks. As noted above, the file system is stored on disk using a hierarchical structure including data blocks and indirect blocks. Thus, for a given set of transactions, the first I/O request includes the data blocks to be written to disk, while subsequent I/O requests include the corresponding indirect blocks containing one or more block pointers. Accordingly, I/O request referenced in ST 104 includes data blocks.

Continuing with the discussion of FIG. 4, the SPA, upon receiving the I/O request (including data blocks from the DMU), writes the data blocks into the storage pool (ST 106). The SPA subsequently calculates a secure checksum for each data block written into the storage pool (ST 108). In one embodiment, the checksum module (203 in FIG. 2) within the SPA is used to calculate the checksum for each data block written into the storage pool. The checksums are subsequently forwarded to the DMU (ST 110). The DMU then assembles the indirect blocks using the secure checksums (ST 112). Specifically, the DMU places the secure checksum for a given data block in the appropriate block pointer within the indirect block (i.e., the parent indirect block of the data block). Next, the indirect blocks are forwarded to the SPA (ST 114). Those skilled in the art will appreciate that the aforementioned indirect blocks correspond to the indirect blocks that directly point (via the block pointers) to the data blocks (as opposed to indirect blocks that point to other indirect blocks).

Next, the SPA receives and subsequently writes the indirect blocks into the storage pool (ST 116). A determination is then made whether additional indirect blocks exist to write into the storage pool (i.e., whether the last indirect block written to the storage pool corresponds to the root block) (ST 118). If no additional indirect blocks exist, then the method is complete. However, if additional indirect blocks exist, then the SPA calculates a secure checksum for each of the indirect blocks written into the storage pool (ST 120). The secure checksums for each of the indirect blocks are subsequently forwarded to the DMU (ST 122). Steps ST 112 through ST 122 are subsequently repeated until the root block is written into the storage pool.

Those skilled in the art will appreciate that while the aforementioned method includes the calculation of a secure checksum for each data block and subsequent indirect block stored in the file system, the invention may be implemented using a secure checksum function only on certain sub-trees and regular checksum functions (i.e., Cyclic Redundancy Check (CRC), etc.) for other sub-trees within the file system. Further, those skilled in the art will appreciate that more than one secure checksum function may be used to calculate the secure checksums. For example, one indirect block may include a checksum calculated using MD5, while another indirect block may include a checksum calculated using SHA1.

Figure 5:
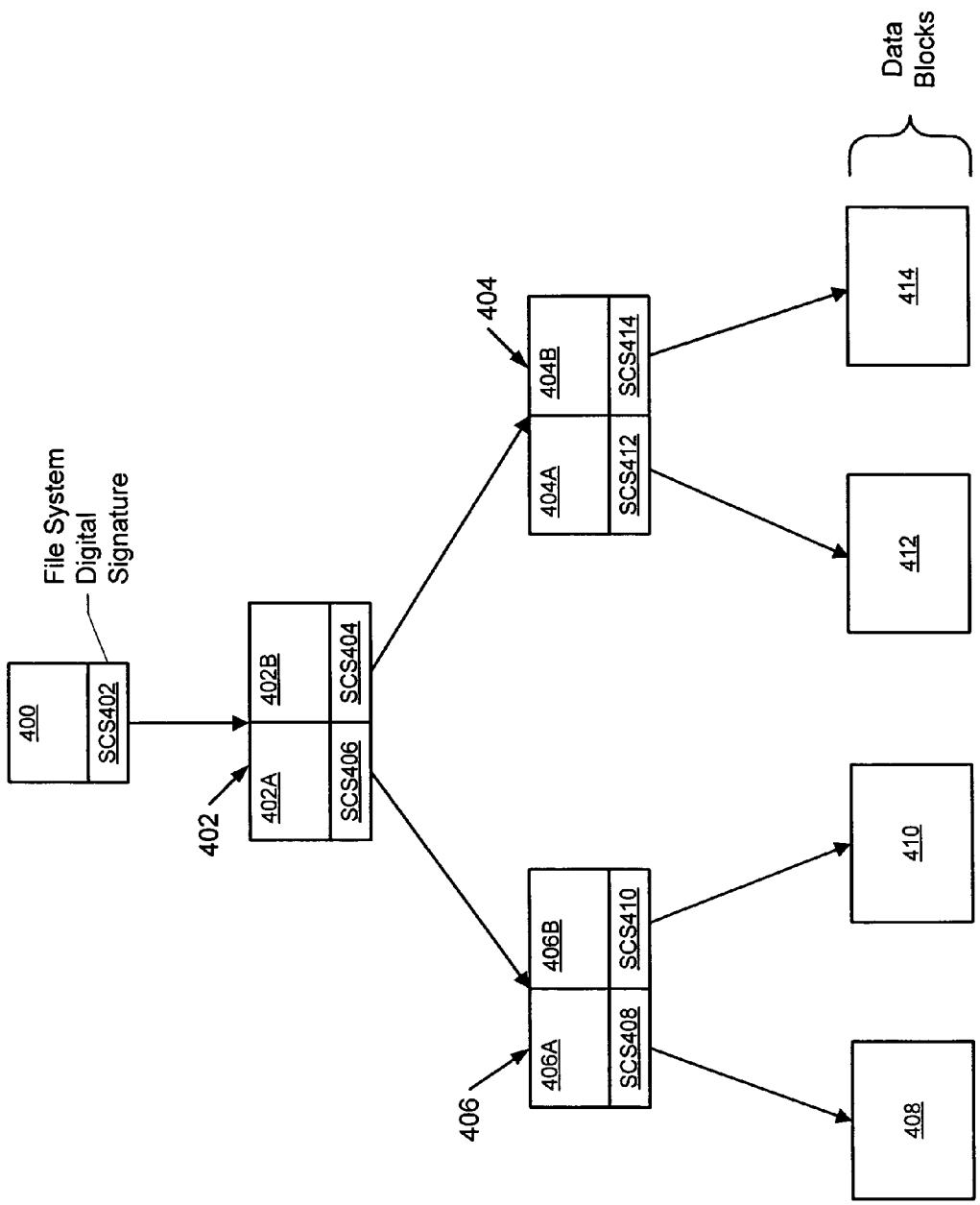
FIG. 5 shows a hierarchical data configuration in accordance with an embodiment of the invention.

FIG. 5 shows a hierarchical data configuration in accordance with an embodiment of the invention. Specifically, FIG. 5 shows a detailed view of the data blocks and indirect blocks resulting from using the method described in FIG. 4, in accordance with one embodiment of the invention. Specifically, the file system includes four data blocks (i.e., 408, 410, 412, and 414). Each data block (408, 410, 412, and 414) within the file system has a corresponding secure checksum (SCS408, SCS410, SCS412, and SCS414, respectively) stored in the corresponding block pointer (406A, 406B, 404A, 404B, respectively). Each of the block pointers (406A, 406B, 404A, and 404B) is stored in an indirect block (i.e., 406, 404). Each indirect block (404, 406) also has a corresponding secure checksum (SCS404, SCS406, respectively) stored in a corresponding block pointer in a parent indirect block (402). Specifically, block pointer (402A) includes the secure checksum (SCS406) for indirect block (406), and block pointer (402B) includes the secure checksum (SCS404) for indirect block (404). In this particular example, the indirect block (402) is referenced by a root block (400). The root block (400) includes the secure checksum (SCS402) for the array of indirect blocks (402).

The structure of the file system, in particular the contents and relationship between the indirect blocks and the data blocks, allows a user to easily obtain a digital signature for the file system and to readily detect data tampering. Specifically, referring to FIG. 5, each block pointer includes a secure checksum (denoted by SCS in FIG. 5) obtained by applying a secure checksum function to the contents of the child blocks (i.e., data blocks and indirect blocks) referenced by the particular indirect block containing that block pointer.

The manner in which the secure checksums are calculated and stored allows the secure checksums to be self-validating.

Thus, if a block (i.e., a data block or an indirect block) within the file system is modified (e.g., tampered with) the secure checksum stored within the indirect block referencing the block will not equal the secure checksum calculated for the tampered block, thereby alerting the user that the block has been tampered with. Further, because of the self-validating nature of the file system, if an unauthorized user modifies a block and attempts to "mask" the modification, the user will need to at least modify the secure checksums stored in every block in the path between the modified block and the root block. It is not possible to change the checksum within any block without making that block's checksum inconsistent with its parent's checksum; therefore the checksum within the root block serves as the digital signature. Further, as a result of the self-validating property, the secure checksum stored in the root block corresponds to the digital signature of the file system.

Figure 6:
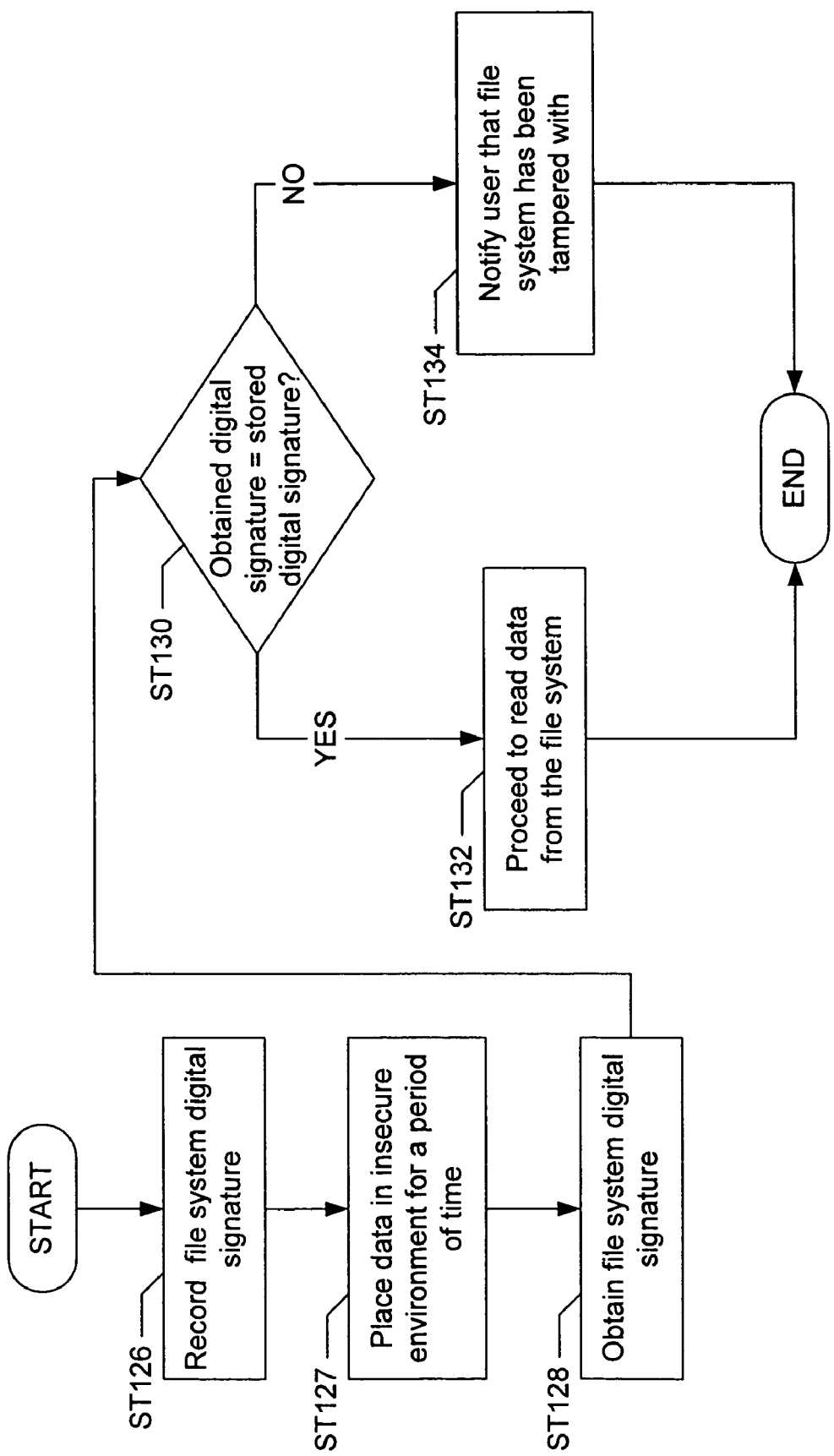
FIGS. 6-7 shows a flow chart in accordance with an embodiment of the invention.

FIG. 6 shows a flow chart for using the secure checksum to detect data tampering in accordance with one embodiment of the invention. As noted above, the digital signature of the file system and the secure checksums within each of the individual blocks may be used to determine whether the file system has been tampered with. Initially, the file system digital signature (i.e., the secure checksum stored in the root block) is recorded (ST126). In one embodiment of the invention, the file system digital signature is recorded in a separate location from the file system (e.g., on another system, on a removable medium such as a compact disk, a flash drive, etc.). Those skilled in the art will appreciate that the digital signature may also be stored on a piece of paper or remembered by the administrator.

The digital signature of the file system is typically recorded when the file system is secure (i.e., when the user is confident that the file system has not been tampered with). The file system for which the digital signature was obtain in ST126 is subsequently placed in an insecure environment for a period of time (ST127). The insecure environment may correspond to any environment in which the file system is subject to tampering. The administrator (or a user with equivalent or similar privileges) may subsequently obtain the digital signature of the file system in order to determine whether the system has been tampered with while it was in an insecure area (ST128). In one embodiment of the invention, the file system digital signature is obtained by retrieving the secure checksum located in the root block of the file system. Those skilled in the art will appreciate that the file system is not modified (i.e., intentionally modified by an authorized user) between ST126 and ST128. The time period between ST126 and ST128 may correspond to moving the file system (or more specifically the physical disks upon which the file system resides) to a new location. If the file system has been moved to a new location, the file system digital signature obtained in ST128 corresponds to the secure checksum located in the root block when the file system is powered-up in the new location.

Once the file system digital signature is obtained from the file system, a determination is made whether the file system digital signature obtained from the file system equals the file system digital signature recorded in ST126 (ST130). If the file system digital signature obtained from the file system equals the file system digital signature recorded in ST126, then the user may proceed to read data from the file system (ST132). Alternatively, if file system digital signature obtained from the file system does not equal the file system digital signature recorded in ST126, then the user is notified (e.g., via e-mail, an error message, etc.) that the file system has been tampered with (ST134).

Figure 7:
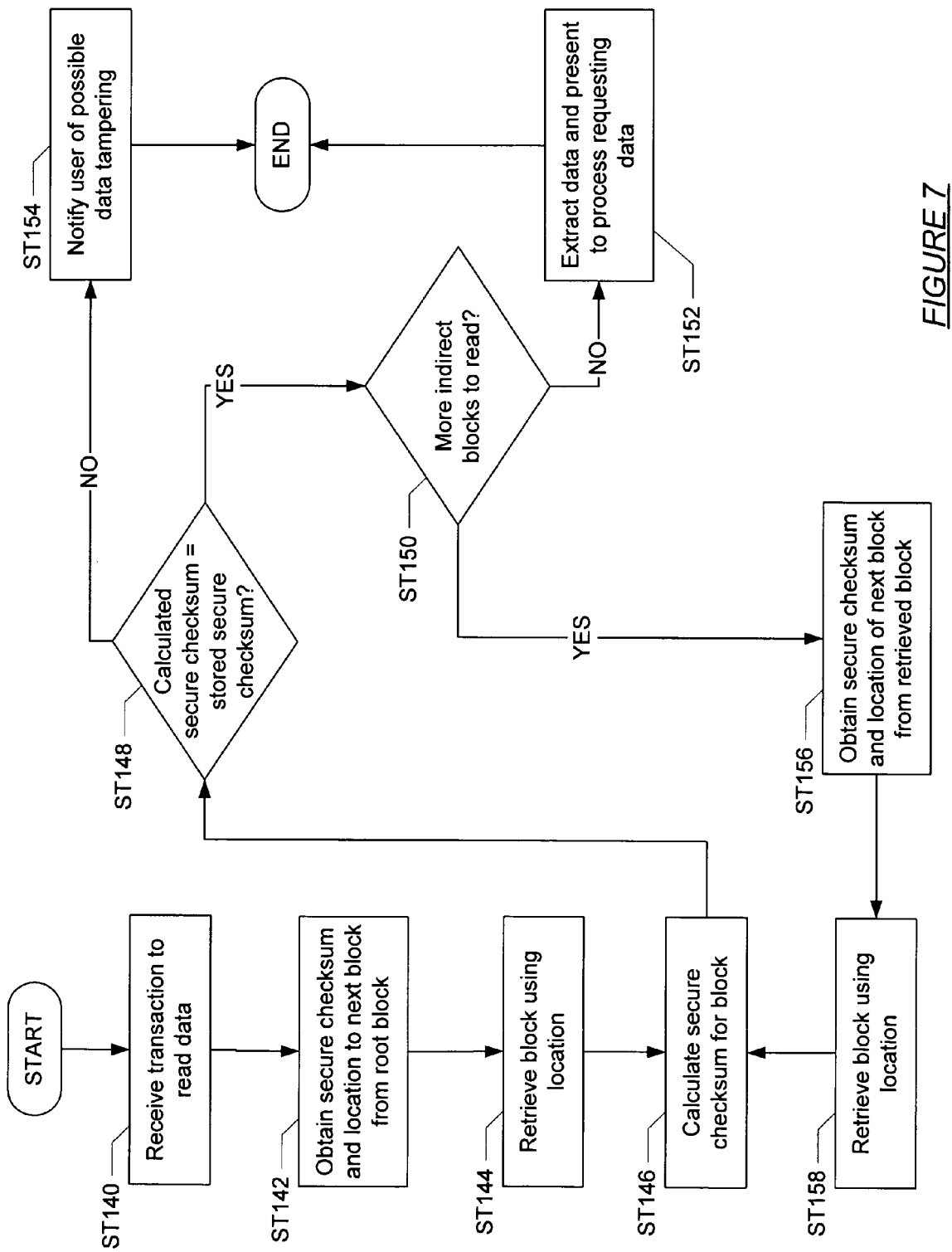

In one embodiment of the invention, the aforementioned method may be used to determine whether the data has been tampered with, for example, when the disks containing the file system have been shipped from one physical location to another, and the user wants to ensure that the data within the file system has not been tampered with. Further, the method described in FIG. 6 above may be used when the system containing the file system is initially "brought up" after the system has been relocated. In general, the method described in FIG. 6 provides an initial check to determine whether the data has been tampered with. However, a situation may occur where the file system digital signature matches the stored digital signature, but individual data blocks within the file system may have been tampered with. FIG. 7 provides a method for determining whether individual blocks within the file system have been tampered with.

FIG. 7 shows a flow chart in accordance with one embodiment of the invention. More specifically, FIG. 7 details a method for reading data in accordance with one embodiment of the invention. Initially, a transaction to read data is received (ST 140). A secure checksum and a location to the next block (i.e., a data block or an indirect block) stored in the root block are subsequently retrieved (ST 142). The location (e.g., the metaslab ID and offset) is subsequently used to obtain the block (i.e., the data block or the indirect block) (ST 144). The secure checksum of the retrieved block is then calculated (ST 146). A determination is subsequently made whether the stored secure checksum is equal to the calculated secure checksum (ST 148). If the stored secure checksum is not equal to the calculated secure checksum, then the user is notified of possible data tampering (e.g., an error message is generated indicating that the data is corrupted) (ST 154).

If the stored secure checksum is equal to the calculated secure checksum, then a determination is made whether the retrieved block is a data block (ST 150). If the retrieved block is a data block, then the data is extracted from the data block and presented to the process requesting the data (ST 152). Alternatively, if the retrieved block is not the data block, then the location of the next block (stored within a block pointer within the retrieved block) is obtained (ST 156). The block (data block or indirect block) at the location is subsequently obtained (ST 158). Steps ST 146 through ST 154 are subsequently repeated until either data tampering is detected (i.e., ST 148) or the data block is encountered (i.e., ST 152).

In one embodiment of the invention, the method described in FIG. 7 may be conducted prior to using the file system. Alternatively, the method described in FIG. 7 may be performed during every request to obtain a data block.

The invention may be implemented on virtually any type of computer regardless of the platform being used. For example, as shown in FIG. 8, a networked computer system (500) includes a processor (502), associated memory (504), a storage device (506), and numerous other elements and functionalities typical of today's computers (not shown). The networked computer (500) may also include input means, such as a keyboard (508) and a mouse (510), and output means, such as a monitor (512). The networked computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer (500) may be located at a remote location and connected to the other elements over a network. Further, the invention may be implemented on a distributed system having a plurality of nodes, where each portion of the invention (e.g., the storage pool, the SPA, the DMU, etc.) may be located on a different node within the distributed system. In one embodiment of the invention, the node corresponds to a computer system. Alternatively, the node may correspond to a processor with associated physical memory.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining whether a file system has been tampered with, comprising:
    retrieving a file system digital signature for the file system,
        wherein the file system comprises a root block, a first indirect block, a second indirect block, a third indirect block, a fourth indirect block, and a data block,
        wherein the root block, the first indirect block, the second indirect block, the third indirect block, the fourth indirect block, and the data block are located on distinct metaslabs within a storage pool,
        wherein the root block comprises references to the first indirect block and the second indirect block,
        wherein the first indirect block comprises a first reference to the third indirect block,
        wherein a first checksum is generated using content of the third indirect block and is stored in the first indirect block,
        wherein the second indirect block comprises a second reference to the fourth indirect block,
        wherein a second checksum is generated using content of the fourth indirect block and is stored in the second indirect block,
        wherein the root block comprises the file system digital signature, and
        wherein the file system digital signature is generated by applying a checksum function to the first checksum and the second checksum;
    determining whether the retrieved file system digital signature is equal to a stored file system digital signature;
    obtaining the data block from the file system using the third indirect block, if the retrieved file system digital signature is equal to the stored file system digital signature; and
    notifying a user, if the retrieved file system digital signature is not equal to the stored file system digital signature.

2. The method of claim 1, wherein the checksum is obtained when the file system is secure.

3. The method of claim 1, wherein the checksum is obtained when the file system is not secure.

4. The method of claim 1, wherein obtaining the data block comprises:
    obtaining the third indirect block comprising a stored secure checksum and a data block location;
    obtaining the data block using the data block location;
    calculating a secure checksum for the data block to obtain a calculated secure checksum;

retrieving the data from the data block, if the stored secure checksum equals the calculated secure checksum; and notifying the user that the data block has been tampered, if the stored secure checksum is not equal to the calculated secure checksum.

5. A computer system for determining whether a file system has been tampered with, comprising:

a processor;

a memory;

a storage device; and software instructions stored in the memory for enabling the computer system under control of the processor, to:

retrieve a file system digital signature for the file system, wherein the file system comprises a root block, a first indirect block, a second indirect block, a third indirect block, a fourth indirect block, and a data block, wherein the root block, the first indirect block, the second indirect block, the third indirect block, the fourth indirect block, and the data block are located on distinct metaslabs within a storage pool, wherein the root block comprises references to the first indirect block and the second indirect block, wherein the first indirect block comprises a first reference to a third indirect block, wherein a first checksum is generated using content of the third indirect block and is stored in the first indirect block, wherein the second indirect block comprises a second reference to a fourth indirect block, wherein a second checksum is generated using content of the fourth indirect block and is stored in the second indirect block, wherein the root block comprises the file system digital signature, and wherein the file system digital signature is generated by applying a checksum function to the first checksum and the second checksum;

determine whether the retrieved file system digital signature is equal to a stored file system digital signature;

obtain the data block from the file system using the third indirect block, if the retrieved file system digital signature is equal to the stored file system digital signature; and notify a user if the retrieved file system digital signature is not equal to the stored file system digital signature.

* * * * *